United States Patent [19]

Vieli

[11] 4,332,908

[45] Jun. 1, 1982

[54] FOAMED GRANULAR GLASS

[75] Inventor: Otto A. Vieli, Rhäzüns, Switzerland

[73] Assignee: Millcell AG, Sarnen, Switzerland

[21] Appl. No.: 200,506

[22] PCT Filed: Nov. 27, 1979

[86] PCT No.: PCT/CH79/00150

§ 371 Date: Jul. 30, 1980

§ 102(e) Date: Jul. 28, 1980

[87] PCT Pub. No.: WO80/01162

PCT Pub. Date: Jun. 12, 1980

[30] Foreign Application Priority Data

Nov. 30, 1978 [CH] Switzerland .................. 12265/78

[51] Int. Cl.³ ............................................ C03C 11/00
[52] U.S. Cl. .......................................... 501/39; 65/22
[58] Field of Search .................... 106/40 V; 501/39

[56] References Cited

U.S. PATENT DOCUMENTS

| 3,321,414 | 5/1967 | Vieli | 106/40 V |
| 3,562,370 | 2/1971 | Shannon | 106/40 V |
| 3,666,506 | 5/1972 | Cowan et al. | 106/40 V |
| 4,143,202 | 3/1979 | Tseng et al. | 106/40 V |
| 4,234,330 | 11/1980 | Taupin et al. | 501/80 X |

FOREIGN PATENT DOCUMENTS 53-5213 1/1978 Japan ................................. 106/87

Primary Examiner—Helen M. McCarthy
Attorney, Agent, or Firm—Werner W. Kleeman

[57] ABSTRACT

The blown granular glass consists of fragments of a blown glass element and comprises at least 100,000, preferably 1,000,000, per cm³ of bubbles approximately of the same size. It is obtained by grinding the race material into a flour; the flour is mixed into a hot gas by a blowing means; the mixture is blown into a flat base furnace in an amount of blown glass; this amount is cooled after blowing and directly after cooling it is crushed into a granulated material.

4 Claims, No Drawings

FOAMED GRANULAR GLASS

BACKGROUND OF THE INVENTION

Some processes are already known (cf. Swiss Patent Specifications Nos. 426,601 and 473,741 and International Patent Application No. PCT/CH79/00128) for manufacturing foamed granular glass from pulverized glass, with the addition of a blowing agent releasing gas at higher temperatures.

Thereby, for preparing foamed granular glass, it was necessary first to grind the raw material to a powder, to mix this powder with a blowing agent releasing gas in heat, and to form raw granules from the so obtained mixture. The raw granulated material so obtained was then, appropriately together with a parting agent, preheated and blown in a furnace or on a drying belt.

The foamed granulated glass manufactured in this manner had an inhomogeneous structure insofar as the size and the distribution of the cells were different in the surface area of each granule from those in its interior. This fact led to a decrease in compressive strength in the surface area of each granule, and thereby to a decrease in the total compressive strength.

Furthermore, some processes were also described (cf. Luxemburgian Patent Specification No. 79,661, German Published Patent Applications Nos. 2,206,448 and 2,224,009) for manufacturing blocks or plates of foamed glass which, if desired, could be broken down to a granulate. These publications, however, do not contain any indication with respect to the physical or mechanical properties of the granulated material. However, it is clear to the person skilled in the art that by the described processes only relatively coarsely porous products, having a low number of cells and an ununiform size of cells, a relatively high specific weight and a low compressive strength may be obtained.

SUMMARY OF THE INVENTION

It is the object of the invention to create a foamed granular glass having an improved compressive strength while having the same or a reduced specific weight, as well as to create a simple and inexpensive process for manufacturing such foamed granular glass.

The foamed granular glass according to the invention is characterized in that it consists of fragments of a foamed glass element and comprises at least 100,000, appropriately at least 500,000, and preferably at least 1,000,000 of cavities per cm³ of at least approximately the same size.

The grains may have seamed edges.

A further subject of the invention is a process for manufacturing the foamed granular glass according to the invention, which is characterized in that the raw materials are ground into a powder, that this powder is mixed with an organic and/or inorganic blowing agent releasing gas in heat, that the mixture is blown into a flat strand of foamed glass in a flat bed furnace, that this strand is cooled after blowing and is broken into a granulate immediately after cooling.

DETAILED DESCRIPTION OF THE PREFERRED EMBODIMENT

Appropriately, the blowing agent is applied as homogeneous layer onto the surface of the glass grain.

Appropriately, the mixture of powder and blowing agent is gently pre-dried before blowing, so that the water chemically bound in the blowing agent is not driven off.

If cooling is effected violently, the foamed glass strand, due to internal stress, disintegrates into a granulate practically by itself, otherwise disintegration is effected preferably by mechanical breaking.

Preferably, the foamed glass strand is produced on a circulating, endless, caterpillar-like carrier consisting of a steel band or of individual links which, in its upper trace, is surrounded by a flat bed furnace.

The thickness of the layer of the glass strand to be blown is appropriately dimensioned in such a manner that, per unit of area, its heat capacity is greater than that of the carrier. Cooling of the blown foamed glass strand is appropriately effected by cooling the carrier.

The surface of the carrier is preferably provided with a layer of alumina or of an iron-aluminum alloy.

When manufacturing foamed granular glass having seamed edges, the obtained granulate is mechanically worked in such a manner, e.g. in a device working like a coating pan, that the edges are broken.

By the process according to the invention, an extremely fine-pored, very light granulate is obtained which may in particular be used as an aggregate for lightweight concrete and a filler for plastics. The process particularly allows the production of a foamed granular glass having, per cm³, up to 3,000,000 closed cavities and a compressive strength of more than 130 kg/cm² at a specific weight of 0.25. Such physical properties are not obtainable for a granulate which was granulated in its raw state and blown afterwards.

EXAMPLE

First, a pasty blowing agent was produced by mixing
100 parts by weight of water
32 parts by weight of water glass (28° Bé)
4 parts by weight of glycerol (unpurified), and
15 parts by weight of sodium bentonite (clearing bentonite).

The blowing agent so obtained was mixed with 500 parts by weight of finely ground glass powder. The mixture is dried at 120° to 180° C. and if necessary sieved by means of a screen having 0.3 mm mesh aperture.

The glass powder activated in this manner, either in this composition, or after dilution with up to five times its amount of glass powder, is shortly blown in a layer of 0.5 to 5 cm thickness at 780° C. in an endless band conveyer furnace. When leaving the furnace, the strand of foamed glass is chilled and crushed to the desired granule size.

If a coarse granulate is desired, a mechanical crushing may be omitted, provided that chilling is effected very briskly, e.g. by means of water. In this case, the strand of foamed glass disintegrates solely due to internal stress. Thereby, the obtained granulate is finer with decreasing thickness of the strand of foamed glass.

I claim:

1. Foamed granular glass, characterized in that it consists of fragments of a foamed glass element having at least 100,000 cavities per cm³ of at least approximately the same size; it has a compressive strength greater than 130 kg/cm²; and it has a specific weight of about 0.25.

2. Foamed granular glass as claimed in claim 1, characterized in that it comprises at least 500,000 cavities per cm³.

3. Foamed granular glass as claimed in claim 2, characterized in that it comprises at least 1,000,000 cavities per cm³.

4. Foamed granular glass as claimed in any of claims 1 to 3, characterized in that the grains of granulate have seamed edges.

* * * * *